(12) United States Patent
Elrod et al.

(10) Patent No.: US 10,120,733 B2
(45) Date of Patent: Nov. 6, 2018

(54) REMOTE PROCEDURE CALL SUPPORTING MULTIPLE VERSIONS

(75) Inventors: Thomas Mitchell Elrod, Peachtree City, GA (US); Ron Sigal, Kingston, NY (US)

(73) Assignee: Red Hat, Inc., Raleigh, NC (US)

( * ) Notice: Subject to any disclaimer, the term of this patent is extended or adjusted under 35 U.S.C. 154(b) by 1425 days.

(21) Appl. No.: 11/897,632

(22) Filed: Aug. 30, 2007

(65) Prior Publication Data

US 2009/0064126 A1    Mar. 5, 2009

(51) Int. Cl.
*G06F 15/177*  (2006.01)
*G06F 9/54*  (2006.01)

(52) U.S. Cl.
CPC .................................. *G06F 9/541* (2013.01)

(58) Field of Classification Search
CPC .............................. H04L 67/10; H04L 41/0816
USPC ......... 709/203, 221, 220; 717/170; 719/328, 719/330
See application file for complete search history.

(56) References Cited

U.S. PATENT DOCUMENTS

| | | | | |
|---|---|---|---|---|
| 5,630,135 | A * | 5/1997 | Orimo et al. .................. | 718/106 |
| 5,682,534 | A * | 10/1997 | Kapoor et al. ................. | 719/328 |
| 5,872,973 | A * | 2/1999 | Mitchell et al. ............... | 719/332 |
| 5,913,027 | A * | 6/1999 | Matsuda et al. ............... | 709/201 |
| 5,915,112 | A * | 6/1999 | Boutcher ....................... | 719/330 |
| 5,926,636 | A * | 7/1999 | Lam ......................... | G06F 9/547 709/232 |
| 6,477,586 | B1 * | 11/2002 | Achenson et al. ............ | 719/330 |
| 6,493,768 | B1 * | 12/2002 | Boutcher ....................... | 719/330 |
| 6,496,871 | B1 * | 12/2002 | Jagannathan et al. ........ | 719/317 |
| 6,622,302 | B1 * | 9/2003 | Delaney et al. ............... | 717/170 |
| 6,658,659 | B2 * | 12/2003 | Hiller et al. ................... | 717/170 |
| 6,826,750 | B1 * | 11/2004 | Curtis et al. .................. | 717/170 |
| 6,868,425 | B1 * | 3/2005 | Bergstraesser et al. ...... | 717/170 |
| 6,993,759 | B2 * | 1/2006 | Aptus et al. ................... | 717/170 |
| 6,996,817 | B2 * | 2/2006 | Birum et al. .................. | 717/170 |
| 7,043,735 | B2 * | 5/2006 | Yamaguchi .................... | 719/316 |
| 7,055,147 | B2 * | 5/2006 | Iterum et al. .................. | 717/170 |
| 7,107,594 | B1 * | 9/2006 | Fischer et al. ................ | 719/310 |
| 7,120,652 | B2 * | 10/2006 | Maslowski .................... | 717/170 |

(Continued)

OTHER PUBLICATIONS

John Mazzitelli, Introducing JBoss Remoting, Feb. 23, 2005, pp. 1-7, Published on ONJava.com.
Ron Sigal; Tom Elrod, Using Virtual Sockets to Fix Software Broken by Firewalls Without Violating Security, JDJ Magazine May 2006, vol. 11 Issue: 5, pp. 38-41.

(Continued)

*Primary Examiner* — Liangche A Wang
*Assistant Examiner* — Sherman Lin
(74) *Attorney, Agent, or Firm* — Lowenstein Sandler LLP (57) ABSTRACT

A remoting client and a remoting server are described. In one embodiment, the remoting client has a client remote access application, a client invoker, a marshaller, and an unmarhaller. The client remote access application provides a version indicator of the client remote access application and receives a version indicator of a server remote access application. The client invoker generates an invocation request including the version indicator of the client remote access application. The client remote access application determines a compatible version between the client remote access application and the server remote access application based on the version indicator of the client remote access application and the version indicator of the server remote access application.

8 Claims, 7 Drawing Sheets

(56) References Cited

U.S. PATENT DOCUMENTS

| | | | |
|---|---|---|---|
| 7,140,012 B2* | 11/2006 | Pugh et al. | 717/170 |
| 7,260,818 B1* | 8/2007 | Iterum et al. | 717/170 |
| 7,466,659 B1* | 12/2008 | Kazar et al. | 370/252 |
| 7,506,334 B2* | 3/2009 | Curtis et al. | 717/170 |
| 7,519,950 B2* | 4/2009 | Curtis et al. | 717/120 |
| 7,593,958 B2* | 9/2009 | Bergstraesser et al. | 717/170 |
| 7,600,219 B2* | 10/2009 | Tsantilis | 717/122 |
| 7,610,316 B2* | 10/2009 | Bartz et al. | 717/170 |
| 7,653,914 B2* | 1/2010 | Krohn et al. | 719/328 |
| 2001/0056505 A1 | 12/2001 | Alibakhsh et al. | |
| 2002/0078262 A1* | 6/2002 | Harrison et al. | 709/331 |
| 2003/0145315 A1* | 7/2003 | Aro et al. | 717/170 |
| 2004/0003085 A1 | 1/2004 | Joseph et al. | |
| 2004/0045012 A1* | 3/2004 | Doraisamy | 719/321 |
| 2004/0088349 A1* | 5/2004 | Beck | H04L 63/0407 709/203 |
| 2004/0133644 A1* | 7/2004 | Warren | H04L 12/58 709/206 |
| 2004/0172462 A1* | 9/2004 | Iterum et al. | 709/223 |
| 2006/0195834 A1* | 8/2006 | Nichols et al. | 717/168 |
| 2007/0220507 A1* | 9/2007 | Back et al. | 717/170 |
| 2009/0064208 A1 | 3/2009 | Elrod | |

OTHER PUBLICATIONS

Ron Sigal, The Multiplex Subsystem of the JBoss Remoting Projects, Jul. 4, 2006, pp. 1-29.

JBoss Remoting Guide, JBoss Remoting Version 2.0.0.GA, Aug. 29, 2006, Copyright 2006 JBoss, Inc., 146 pages.

Upadhyay, Sudhir, Understanding JSSE Message exchange between a Java client and server communicating over SSL, May 11, 2005, pp. 1-18.

Mishra, Mayank, Simple 4 steps to use X509V1 Certificates to secure WS communication using WSIT, Nov. 20, 2006, pp. 1-4.

USPTO; Office Action for U.S. Appl. No. 11/897,707, dated Dec. 17, 2010.

USPTO; Office Action for U.S. Appl. No. 11/897,707, dated May 18, 2011.

USPTO; Office Action for U.S. Appl. No. 11/897,707, dated Dec. 21, 2011.

USPTO; Office Action for U.S. Appl. No. 11/897,707, dated May 4, 2012.

Office Action for U.S. Appl. No. 11/897,707, dated Sep. 20, 2013.

Office Action for U.S. Appl. No. 11/897,707, dated Apr. 2, 2014.

Office Action for U.S. Appl. No. 11/897,707, dated Sep. 8, 2014.

* cited by examiner

REMOTE PROCEDURE CALL SUPPORTING MULTIPLE VERSIONS

TECHNICAL FIELD

Embodiments of the present invention relate to network communication, and more specifically to network based invocations.

BACKGROUND

Remote procedure calls (RPC) allow a computer program to cause a subroutine or procedure to execute in another address space (commonly on another computer on a shared network) without the programmer explicitly coding the details for this remote interaction. That is, the programmer would write essentially the same code whether the subroutine is local to the executing program, or remote. When the software is written using object-oriented principles, RPC may also be referred to as remote invocation or remote method invocation.

Current Remote or Remoting method invocations include, for example, RMI, EJB, and web services. The Java Remote Method Invocation API, or Java RMI, is a Java application programming interface for performing the object equivalent of remote procedure calls.

There are two common implementations of the API. The original implementation depends on Java Virtual Machine (JVM) class representation mechanisms and it thus only supports making calls from one JVM to another. The protocol underlying this Java-only implementation is known as Java Remote Method Protocol (JRMP). In order to support code running in a non-JVM context, a CORBA version was later developed. RMI may refer to the programming interface or may signify both the API and JRMP, whereas the term RMI-IIOP, read RMI over IIOP, denotes the RMI interface delegating most of the functionality to the supporting CORBA implementation.

The original RMI API was generalized somewhat to support different implementations, such as an HTTP transport. Additionally, work was done to CORBA, adding a pass by value capability, to support the RMI interface. Still, the RMI-IIOP and JRMP implementations are not fully identical in their interfaces.

However, a client-side agent may have difficulty communicating using an application version different from the application version of the server-side agent. A need therefore exists for an apparatus and a method to assure versioning compatibility between the remoting client and the remoting server.

BRIEF DESCRIPTION OF THE DRAWINGS

The present invention is illustrated by way of example, and not by way of limitation, in the figures of the accompanying drawings and in which.

DETAILED DESCRIPTION

Described herein is a method and apparatus for providing version compatibility of remoting applications between a remoting client and a remoting server. The remoting client and the remoting server exchange information containing an indicator of the version of their respective remote access application. A compatible version may be determined based on the exchanged information.

General Architecture

Figure 1:
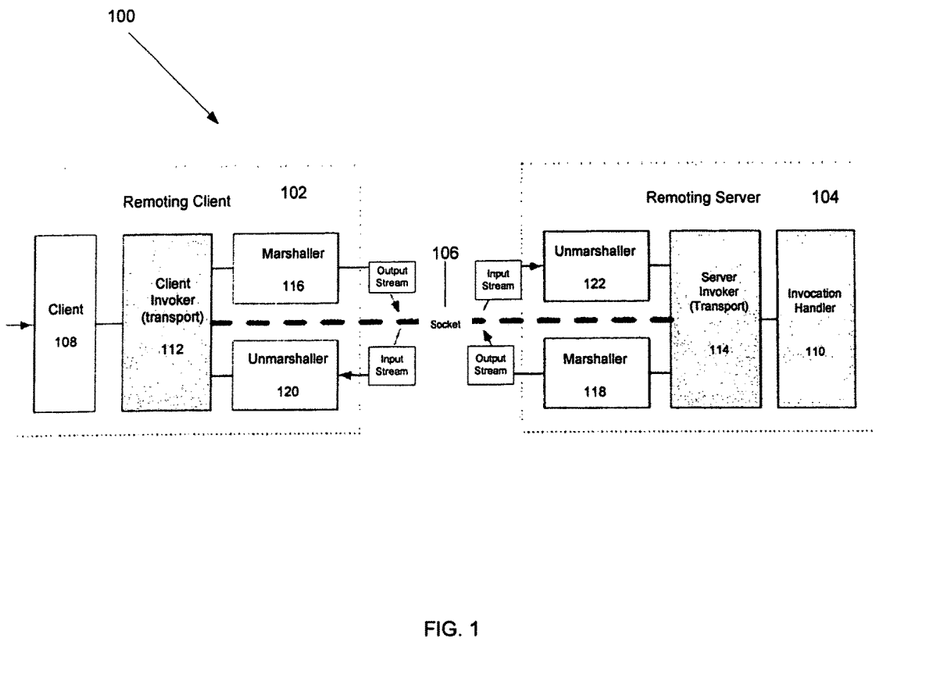
FIG. 1 illustrates a network architecture in which embodiments of the present invention may be implemented.

FIG. 1 illustrates an exemplary architecture 100 composed of a remoting client 102 coupled to a remoting server 104 via a network 106. A remoting framework with a single, simple application programming interface (API) for making network based invocations, remoting calls, and other network related services is described. An example of a remoting framework is described in JBoss Remoting. The purpose of JBoss Remoting is to provide a single API for most network based invocations and related service that uses pluggable transports and data marshallers. The JBoss Remoting API provides the ability for making synchronous and asynchronous remote calls, push and pull callbacks, and automatic discovery of remoting servers. The intention is to allow for the use of different transports to fit different needs, yet still maintain the same API for making the remote invocations and only requiring configuration changes, not code changes.

One important component of the JBoss Remoting architecture is how servers are identified. This is done via an InvokerLocator, which can be represented by a simple String with a URL based format (e.g., socket://myhost:5400). This is all that is required to either create a remoting server or to make a call on a remoting server. The remoting framework will then take the information embedded within the InvokerLocator and construct the underlying remoting components needed and build the full stack required for either making or receiving remote invocations.

Some exemplary features of JBoss Remoting include server identification, pluggable transports, pluggable data marshallers, automatic discovery, server grouping, callbacks, asynchronous calls, local invocation, remote classloading, and sending of streams. In server identification, a simple string identifier allows for remoting servers to be identified and called upon. In pluggable transports, different protocol transports can be used such as socket, rmi, http, etc., via the same remoting API. In pluggable data marshallers, different data marshallers and unmarshallers can be used to convert the invocation payloads into desired data format for wire transfer. In automatic detection, remoting servers can be detected as they come on and off line. Server grouping gives the ability to group servers by logical domains, so that servers can only communicate within specified domains. Server callbacks can be received via push and pull models. Pull model allows for persistent stores and memory management. Asynchronous or one way calls can be made to the server. If an invocation on a remoting server that is within the same process space, remoting will automatically make this call by reference, to improve performance. Remote classloading allows for classes, such as custom marshallers, that do not exist within client to be loaded from the server. Sending of streams allows for clients to send input streams to the server, which can be read on demand on the server.

There are several layers to this framework that mirror each other on the client and server side. The outermost layer is the one which the user interacts with—e.g. the remote access application. On the client side, this is the Client API 108 class upon which the user will make its calls. In other words, this can be the external API access point for client code. On the server side, this is the InvocationHandler 110, which is implemented by the user and is the ultimate receiver of invocation requests. Next is the transport, which is controlled by the invoker layers 112, 114. Finally, at the lowest layer are the Marshallers 116, 118 that convert data format to wire format and the UnMarshallers 120, 122 that convert wire format to data format.

When a user calls on the Client API 108 to make an invocation, it will pass this invocation request to the appropriate Client Invoker 112, based on the transport specified by the locator url. Client Invoker 112 will then use Marshaller 116 to convert the invocation request object to the proper data format to send over network 106 to Remoting Server 104.

On the server side, UnMarshaller 122 receives this data from the network 106, converts it back into a standard invocation request object, and sends it on to the Server Invoker 114. The Server Invoker 114 then passes this invocation request on to the user's implementation of the Invocation Handler 110. The response from Invocation Handler 110 passes back through Server Invoker 114 and on to Marshaller 118, which will then convert the invocation response object to the proper data format and send back to Remoting Client 102. UnMarshaller 120 on Remoting Client 102 converts the invocation response from wire data format into standard invocation response object, which will be passed back up through Client Invoker 112 and Client API 108 to the original caller.

Remoting Client

Figure 2:
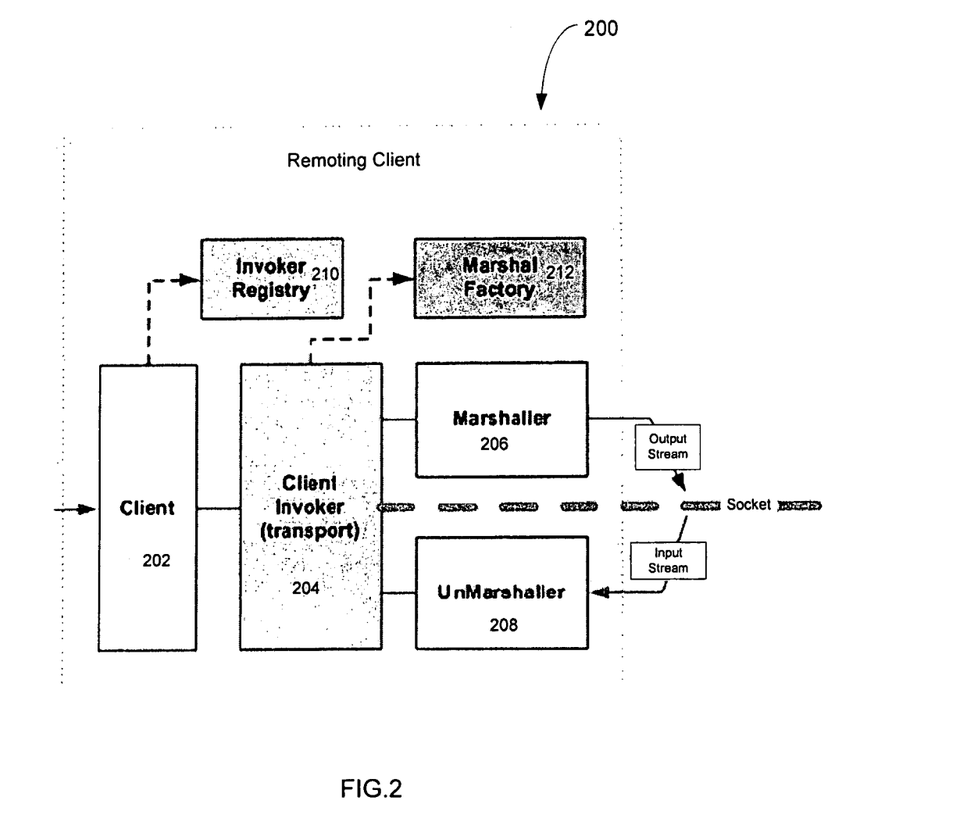
FIG. 2 illustrates a block diagram of one embodiment of a remoting client.

FIG. 2 illustrates a block diagram of one embodiment of a remoting client 200. For determining which client invoker to use, the Client API 202 will pass the InvokerRegistry 210 the locator for the target server it wishes to make invocations on. The InvokerRegistry 210 will return the appropriate client invoker instance based on information contained within the locator, such as transport type. The client invoker 204 will then call upon the MarshalFactory 212 to get the appropriate Marshaller 206 and UnMarshaller 208 for converting the invocation objects to the proper data format for wire transfer. All invokers have a default data type that can be used to get the proper marshal instances, but can be overridden within the locator specified.

Remoting Server

Figure 3:
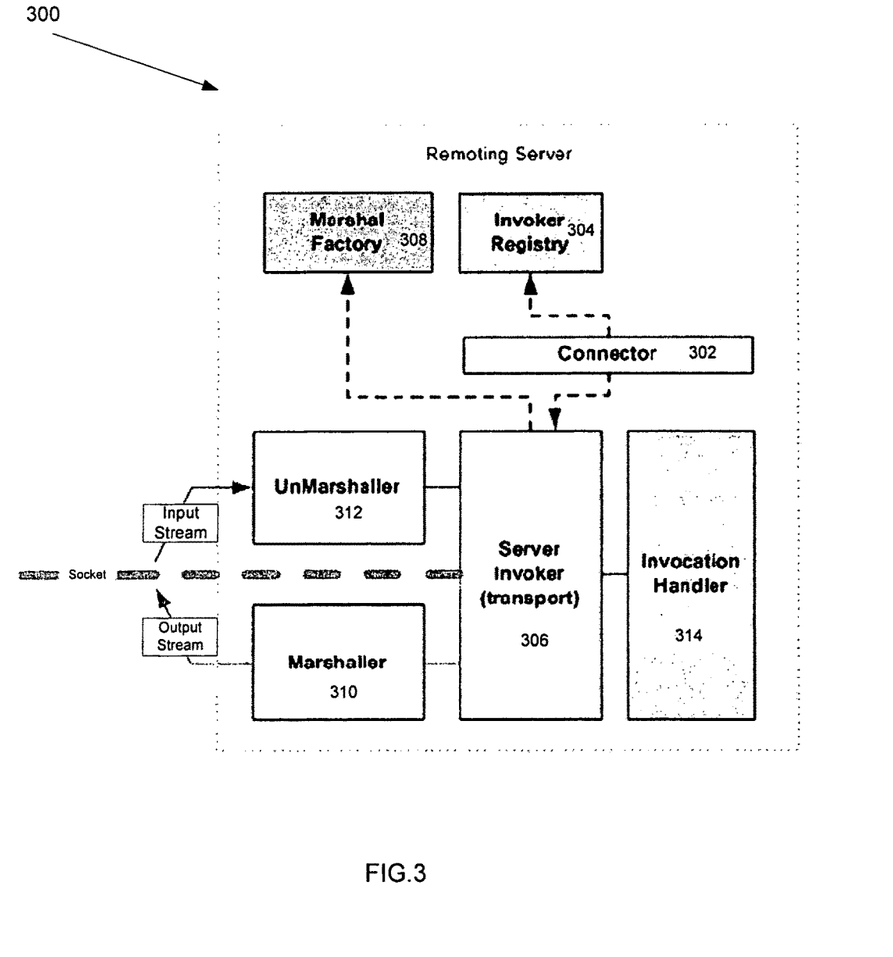
FIG. 3 illustrates a block diagram of one embodiment of a remoting server.

FIG. 3 illustrates a block diagram of one embodiment of a remoting server 300. On the server side, it is the Connector class 302 that is used as the external point for configuration and control of the remoting server 300. The Connector class 302 will call on the InvokerRegistry 304 with its locator to create a Server Invoker 306. Once the server invoker 306 is returned, Connector 302 then registers the invocation handlers 314 on it. Server Invoker 306 uses the MarshalFactory 308 to obtain the proper marshal instances, Marshaller 310, and UnMarshaller 312 as is done on the client side.

Detection

Figure 4:
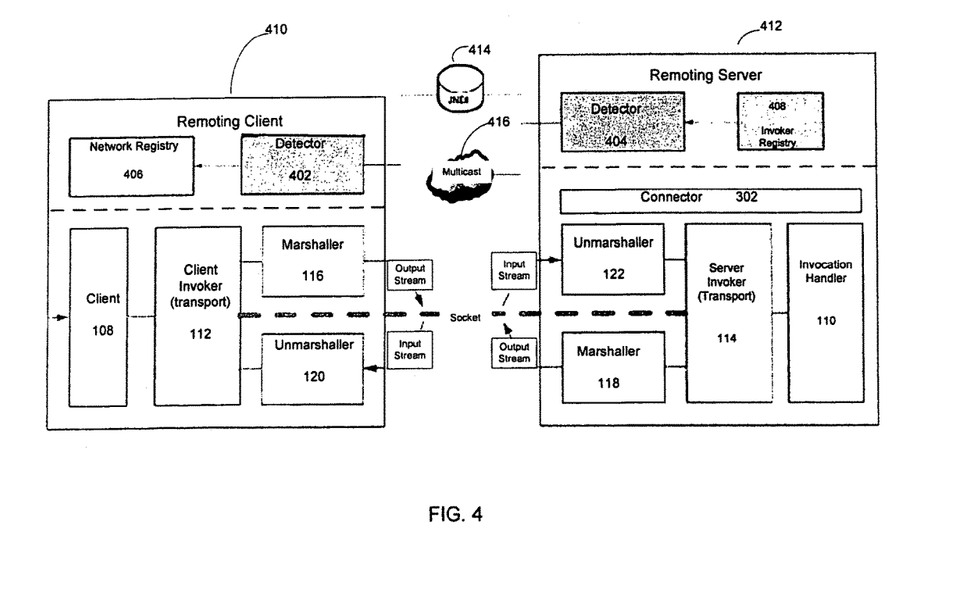
FIG. 4 illustrates a block diagram of another embodiment of a network architecture.

FIG. 4 illustrates a block diagram of another embodiment of a network architecture 400. To add automatic detection, a remoting Detector 402, 404 will need to be added on both the remoting client 410 and the remoting server 412. A Network Registry 406 is added to the remoting client 410. An Invoker Registry 408 is added to the remoting server 412.

When Detector 404 on the server side is created and started, it will periodically pull from the Invoker Registry 408 all the server invokers that it has created. The detector 404 will then use the information to publish a detection message containing the locator and subsystems supported by each server invoker. The publishing of this detection message may be either via a multicast broadcast or a binding into a JNDI server. On the client side, Detector 402 will either receive the multicast broadcast message or poll the JNDI server for detection messages. If Detector 402 determines a detection message is for a remoting server 412 that just came online, it will register it in the Network Registry 406. Network Registry 406 houses the detection information for all the discovered remoting servers. Network Registry 406 may also emit a JMX notification upon any change to this registry of remoting servers. The change to the Network Registry 406 can also be for when Detector 402 has discovered that a remoting server is no longer available and removes it from the registry.

Server Architecture

Figure 5:
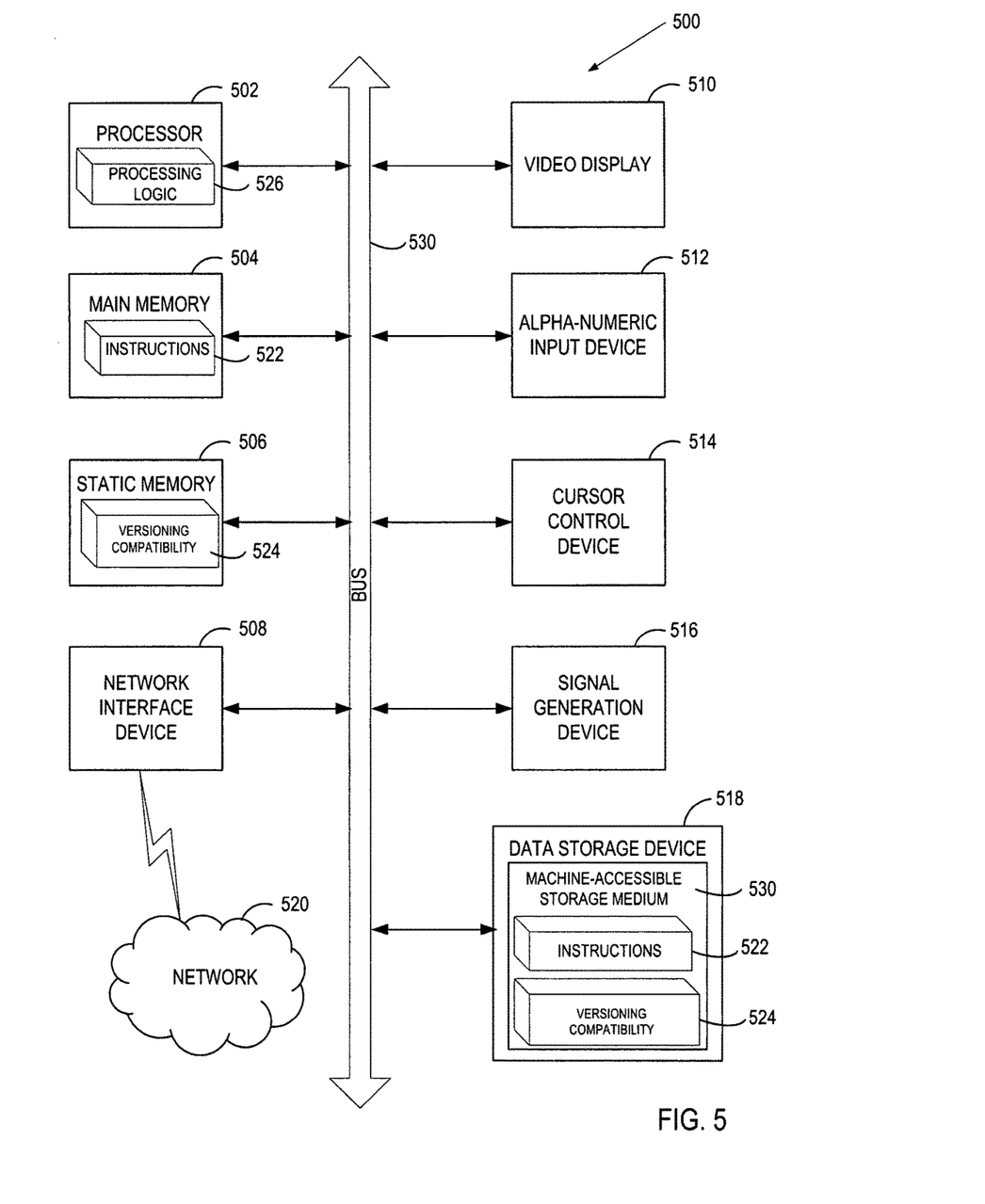
FIG. 5 illustrates a block diagram of an exemplary computer system.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device 502, a main memory 504 (e.g., read-only memory (ROM), flash memory, dynamic random access memory (DRAM) such as synchronous DRAM (SDRAM), a static memory 506 (e.g., flash memory, static random access memory (SRAM), etc.), and a data storage device 518, which communicate with each other via a bus 530.

Processing device 502 represents one or more general-purpose processing devices such as a microprocessor, central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute the processing logic 526 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a machine-accessible storage medium 530 on which is stored one or more sets of instructions (e.g., software 522) embodying any one or more of the methodologies or functions described herein. The software 522 may also reside, completely or at least partially, within the main memory 504 and/or within the processing device 502 during execution thereof by the computer system 500, the main memory 504 and the processing device 502 also constituting machine-accessible storage media. The software 522 may further be transmitted or received over a network 520 via the network interface device 508.

The machine-accessible storage medium 530 may also be used to store versioning compatibility processes 524 as described above. The versioning compatibility 524 may also be stored in other sections of computer system 500, such as static memory 506.

While the machine-accessible storage medium 530 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical and magnetic media, and carrier wave signals.

Versioning Compatibility

A versioning feature has been added to guarantee compatibility between different versions of the remote access applications of a remoting client and a remoting server. In one embodiment, wire versioning may be used to notify each party of the version used. In other words, the version used by a remoting client and a remoting server may be sent on the wire so that the other side will be able to adjust accordingly. In one embodiment, each remote access application may be configured to be backward compatible with a previous version so as to assure full compatibility guarantee. The remote access application may be configured to the requirements of jms, otherwise jms cannot rely on remoting for its stable transport layer. Although a specific wire format may not be a requirement, one should be able to take control of it. In the case of the http transport, one should be able to map a format version to a header, or first byte of the post content, etc.

In accordance with one embodiment, one implementation of the versioning compatibility of remote access application may be as follows. The ConnectionFactory object which is placed in the jndi tree by the server, contains the server's version S. The client knows it's own version C. When the client gets hold of a connection factory from jndi it now knows the server version. For any connections created using that connection factory, the client will use version X, where X is Math.min(S, C) to form some kind of handshake to agree on the lowest common denominator version performed once upon connection setup. This means a client can support many different versions concurrently for different connections depending on the server versions for the respective connection factories. In the marshaller, every invocation from client to server is prefixed on the wire by a byte containing the value X. Any response is also prefixed with the value X. This means that the entire wire format can evolve over time, this include the remote Java API, and the wire format of objects.

In one implementation, the version byte goes at the beginning of each request or response (it doesn't go in each TCP packet—a request/response can be composed of many such packets). This is so the server knows how to deal with the request (or the client with the response). Imagine in version 1.x we have a wireformat for a send request like the following:

byte 0: "23"—represents a send request
bytes 1 . . . serialized form of the message
and the format for an ack was:
byte 0: "27"—represents ack
bytes 1 . . . message id etc.
but in version 2.x we changed it to, for a send:
byte 0: "27" represents send
bytes 1 . . . serialized form of the message Now a client sends a version 1.x send request to the server. All the server knows about is the stream of bytes it's receiving so if version info is not added to the stream then the server doesn't know whether the request is a version 1.x send or a version 2.x ack.

One could overcome this by fixing the request codes across all versions and just vary, say, the serialized form of the request body between versions, which would allow to avoid passing the version number. However, this would be far less flexible and prevent one from being able to change the remote API over time.

In accordance with one embodiment, the version byte is just an incrementing version number starting at zero. So for every new wireformat version to support, the version byte may be increased by one. If a release doesn't change the wireformat then the byte is not changed. This means up to 256 changes can be supported to the wireformat. Changes to the wireformat may be for major releases only. So this would be good for up to 256 major releases.

As for features, older features should be usable in future versions (so can use old clients with newer servers). However, newer clients won't necessarily work with older servers (at least the new features won't be supported by the server).

Figure 6:
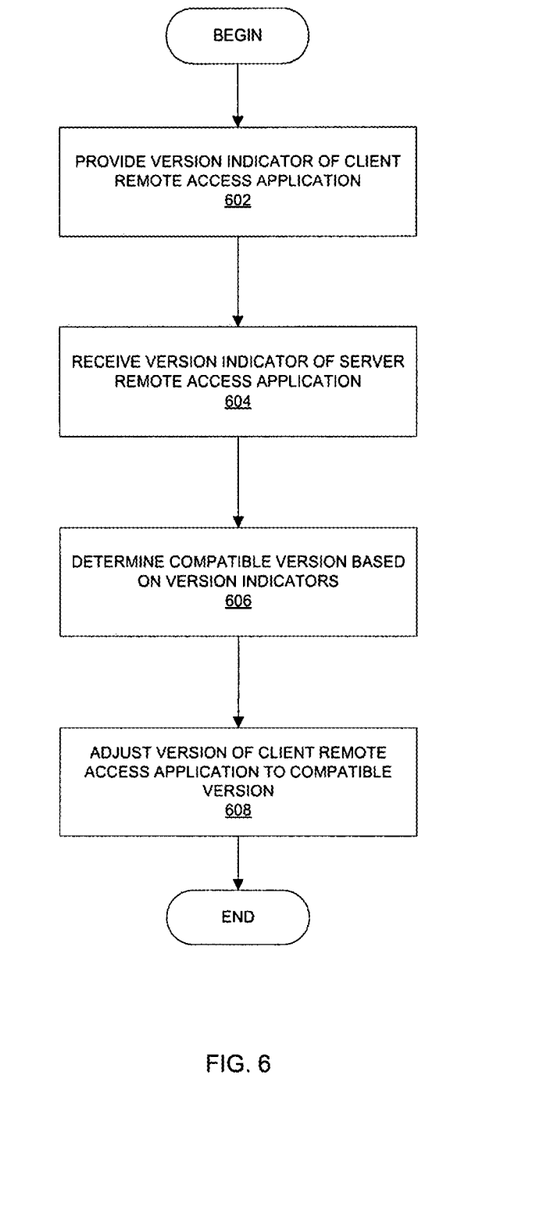
FIG. 6 illustrates a flow diagram of one embodiment of a method for providing compatibility between a remoting client and a remoting server.

FIG. 6 illustrates a flow diagram of one embodiment of wire versioning from a client side. At 602, a version indicator of a client remote access application of the remoting client is provided to the remoting server. In one embodiment, an invocation request is formed with a client invoker of the remoting client by forming a socket connection with the client invoker. The invocation request is converted from an object format to a wire data format with a data marshaller of the remoting client for communication over a network to the remoting server. The invocation request may be prefixed with the version indicator of the client remote access application. At 604, the remoting client receives a communication from the remoting server. The communication includes a prefix including the version indicator of the server remote access application of the remoting server. The communication from the remoting server may be converted from a wire data format to an object format with a data unmarshaller of the remoting client. At 606, a compatible version between the client remote access application and the server remote access application is determined based on the version indicator of the client remote access application and the version indicator of the server remote access application. At 608, the client remote access application may adjust its version in response to the compatible version.

Figure 7:
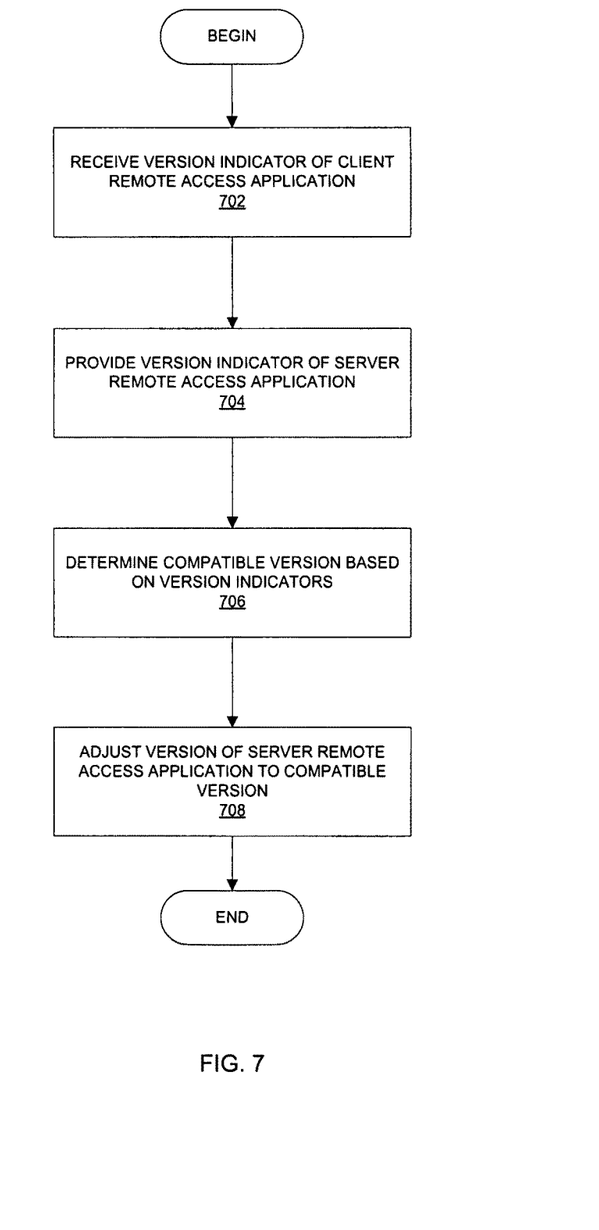
FIG. 7 illustrates a flow diagram of another embodiment of a method for providing compatibility between a remoting client and a remoting server.

FIG. 7 illustrates a flow diagram of another embodiment of wire versioning from a server side. At 702, a remoting server receives a communication from the remoting client. The communication comprises a prefix including the version indicator of the client remote access application of the remoting client. The communication may be converted from a wire data format to an object format with a data unmarshaller of the remoting server.

At 704, a version indicator of a server remote access application of the remoting server is provided to the remoting client. In one embodiment, a response to the remoting client is generated by processing the response with a thread from an invocation handler of the remoting server. The server invoker of the remoting server processed the response. A data marshaller converts the response from an object format to a wire data format for communication over a network to the remoting client. The response may include a prefix including the version indicator of the server remote access application. At 706, a compatible version between the client remote access application and the server remote access application is determined based on the version indicator of the client remote access application and the version indicator of the server remote access application. At 708, the server remote access application may be adjusted its version in response to the compatible version.

In the above description, numerous details were set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-accessible storage medium includes any mechanism for storing or transmitting information in a form readable by a machine (e.g., a computer). For example, a machine-accessible storage medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.).

Thus, a method and apparatus for providing compatibility between a remoting client and a remoting server has been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
receiving, by a remoting server, an invocation request from a remoting client, the invocation request comprising a prefix comprising a client version identifier to indicate a version of a client remote access application of the remoting client, wherein the invocation request is formed by a client invoker instance on the remoting client, the client invoker instance being identified from an invoker registry on the remoting client using an invoker locator for the remoting server, the invoker locator comprising a uniform resource locator (URL);
converting the invocation request from a wire data format to an object format with a data unmarshaller of the remoting server;
generating a response to the remoting client with an invocation handler of the remoting server;
associating a prefix with the response, the prefix comprising a server version identifier to indicate a version of a server remote access application of the remoting server;

converting the response from an object format to a wire data format with a data marshaller of the remoting server for communication over a network to the remoting client;

sending the response comprising the server version identifier of the server remote access application to the remoting client;

determining, by a processing device of the remoting server, a compatible version between the client remote access application and the server remote access application in view of the client version identifier received from the client remote access application and the server version identifier of the server remote access application, wherein determining the compatible version comprises selecting a version for the server remote access application to support a plurality of client versions concurrently, each for a different client connection; and adjusting the version of the server remote access application in response to determining the compatible version.

2. The method of claim 1 wherein generating the response further comprises:

processing the response with a thread from the invocation handler.

3. A remoting server comprising:

a memory to store a version identifier of a server remote access application;

a processing device, operatively coupled to the memory, the processing device to:

receive an invocation request from a remoting client, the invocation request comprising a prefix comprising a client version identifier to indicate a version of a client remote access application of the remoting client, wherein the invocation request is formed by a client invoker instance on the remoting client, the client invoker instance being identified from an invoker registry on the remoting client using an invoker locator corresponding to the remoting server, the invoker locator comprising a uniform resource locator (URL);

convert the invocation request from a wire data format to an object format with a data unmarshaller of the remoting server;

generate a response to the remoting client with an invocation handler of the remoting server;

associate a prefix with the response, the prefix comprising a server version identifier to indicate a version of a server remote access application of the remoting server;

convert the response from an object format to a wire data format with a data marshaller of the remoting server for communication over a network to the remoting client;

send the response comprising the server version identifier of the server remote access application to the remoting client;

determine a compatible version between the client remote access application and the server remote access application in view of the client version identifier received from the client remote access application and the server version identifier of the server remote access application, wherein to determine the compatible version, the processing device to select a version for the server remote access application to support a plurality of client versions concurrently, each for a different client connection; and adjust the version of the server remote access application in response to determining the compatible version.

4. The remoting server of claim 3 further comprising a server invoker coupled to the server remote access application to process a response with a thread from an invocation handler.

5. The remoting server of claim 3 wherein the processing device to receive a prefix including the client version identifier of the client remote access application.

6. The remoting server of claim 3 wherein the server remote access application comprises an invocation handler.

7. A non-transitory computer-accessible storage medium including data that, when accessed by a processing device, cause the processing device to:

receive an invocation request from a remoting client, the invocation request comprising a prefix comprising a client version identifier to indicate a version of a client remote access application of the remoting client, wherein the invocation request is formed by a client invoker instance on the remoting client, the client invoker instance being identified from an invoker registry on the remoting client using an invoker locator corresponding to the remoting server, the invoker locator comprising a uniform resource locator (URL);

convert the invocation request from a wire data format to an object format with a data unmarshaller of the remoting server;

generate a response to the remoting client with an invocation handler of the remoting server;

associate a prefix with the response, the prefix comprising a server version identifier to indicate a version of a server remote access application of the remoting server;

convert the response from an object format to a wire data format with a data marshaller of the remoting server for communication over a network to the remoting client provide the response comprising the server version identifier of the server remote access application to the remoting client;

determine, by the processing device of the server, a compatible version between the client remote access application and the server remote access application in view of the client version identifier received from the client remote access application and the server version identifier of the server remote access application, wherein to determine the compatible version, the processing device to select a version for the server remote access application to support a plurality of client versions concurrently, each for a different client connection; and adjust the version of the server remote access application in response to determining the compatible version.

8. The non-transitory computer-accessible storage medium of claim 7 wherein to generate the response, the processing device further to:

process the response with a thread from the invocation handler.

* * * * *